United States Patent
Smetz

(10) Patent No.: US 8,740,275 B2
(45) Date of Patent: Jun. 3, 2014

(54) ATTACHMENT DEVICE FOR ATTACHING SLINGING OR LASHING MEANS

(75) Inventor: Reinhard Smetz, Baldingen (DE)

(73) Assignee: RUD Ketten Rieger & Dietz GmbH u. Co. KG, Aalen (DE)

( * ) Notice: Subject to any disclaimer, the term of this patent is extended or adjusted under 35 U.S.C. 154(b) by 1449 days.

(21) Appl. No.: 12/070,231

(22) Filed: Feb. 15, 2008

(65) Prior Publication Data

US 2008/0145171 A1   Jun. 19, 2008

Related U.S. Application Data

(62) Division of application No. 10/499,157, filed as application No. PCT/DE02/04689 on Dec. 18, 2002, now abandoned.

(30) Foreign Application Priority Data

Dec. 21, 2001  (DE) .................................. 101 64 598

(51) Int. Cl.
| | |
|---|---|
| B66C 1/66 | (2006.01) |
| B65D 45/00 | (2006.01) |
| F16G 15/08 | (2006.01) |
| F16G 15/00 | (2006.01) |

(52) U.S. Cl.
CPC ................ F16G 15/08 (2013.01); F16G 15/00 (2013.01); B66C 1/66 (2013.01)
USPC ............................... 294/215; 294/89; 403/164

(58) Field of Classification Search
USPC ........ 294/1.1, 215, 89, 82.1; 403/78, 79, 164; 410/101; 248/499
See application file for complete search history.

(56) References Cited

U.S. PATENT DOCUMENTS

| | | | | |
|---|---|---|---|---|
| 2,853,326 | A | * | 9/1958 | Booth ............................ 403/127 |
| 3,244,440 | A | * | 4/1966 | Ashton et al. .................. 403/164 |
| 4,705,422 | A | * | 11/1987 | Tsui et al. ....................... 294/1.1 |
| 4,708,382 | A | * | 11/1987 | LaCount ....................... 294/82.1 |
| 5,248,176 | A | * | 9/1993 | Fredriksson ................... 294/1.1 |
| 5,529,421 | A | * | 6/1996 | Epkens ........................... 403/164 |
| 6,994,501 | B2 | * | 2/2006 | Smetz ............................ 411/400 |
| 2005/0017527 | A1 | * | 1/2005 | Smetz ........................... 294/82.1 |
| 2005/0069379 | A1 | * | 3/2005 | Smetz ........................... 403/164 |

FOREIGN PATENT DOCUMENTS

| | | | |
|---|---|---|---|
| DE | 10013845 | * | 9/2001 |
| DE | 10013845 A1 | * | 9/2001 |
| JP | 60-208625 | | 10/1985 |
| JP | 389078 | | 9/1991 |
| JP | 2000-2239 | | 7/2001 |

* cited by examiner

*Primary Examiner* — Paul T Chin
(74) *Attorney, Agent, or Firm* — Mark P. Stone

(57) ABSTRACT

Disclosed is an attaching device for attaching stopping or lashing means to objects that are to be transported or tied down, comprising a fixing element (1), an attaching element (16), and a connecting element (15) which is rotatably mounted on a socket (4) wrapped around the fixing element (1) and connects the attaching element (16) to the fixing element (1). The connecting element (15) leans against ring flanges (6, 7) placed at the ends of the socket (4) via series of rolling bodies (12, 13) so as to allow said connecting element (15) to rotate without jerking and make it sufficiently tilt-proof.

8 Claims, 2 Drawing Sheets

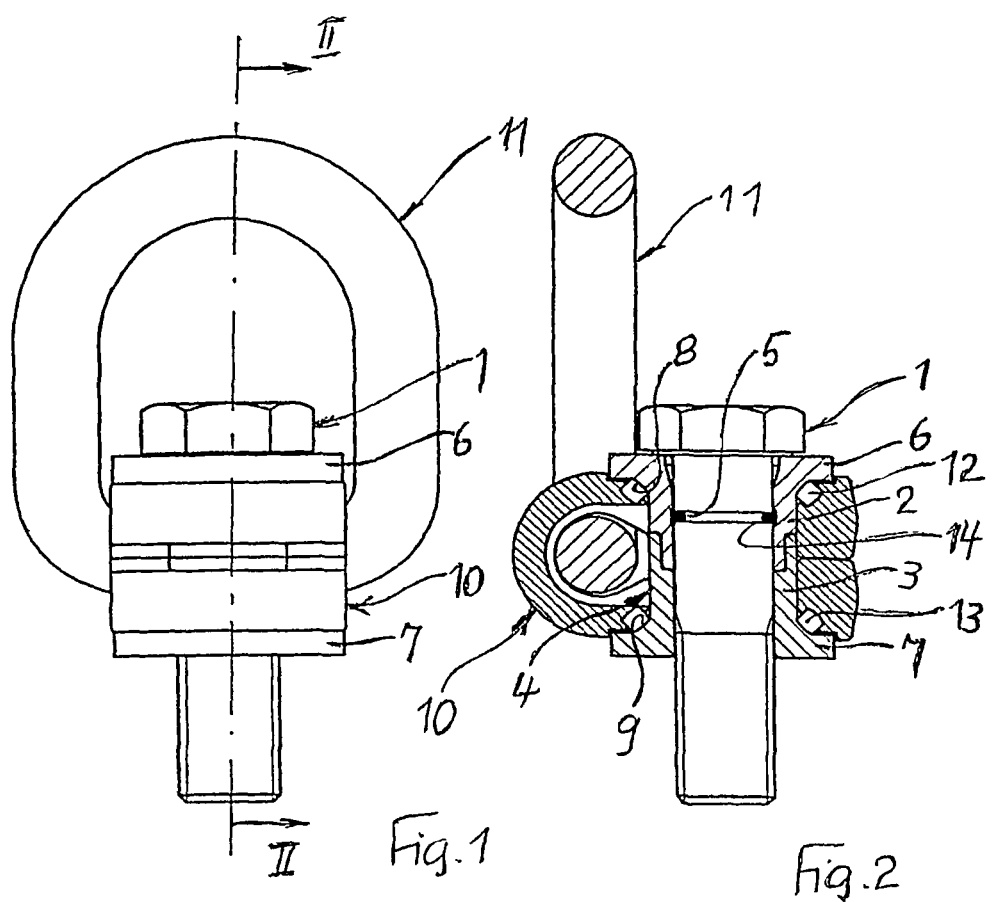

ATTACHMENT DEVICE FOR ATTACHING SLINGING OR LASHING MEANS

The present application is a divisional of Ser. No. 10/499,157, filed Jun. 16, 2004 now abandoned, currently pending, and claims the benefit of the prior application pursuant to 35 U.S.C. Sections 120 and 121. The present application also claims the benefit of International Pat. Appl. No. PCT/DE02/04689, filed Dec. 18, 2002, pursuant to 35 U.S.C. Sections 120 and 371. The benefit of PCT/DE02/04689 was also claimed in Parent Appl. Ser. No. 10/499,157.

TECHNICAL FIELD

The invention relates to an attachment device for attaching slinging or lashing means to articles which are to be transported or lashed, having a fastening element which serves for fastening the same on the respective article and is formed by a bolt, having an attachment element for the slinging or lashing means, and having a connecting element which connects the fastening element to the attachment element, is mounted, such that it can be rotated about the longitudinal axis of the fastening element, on a two-part bushing enclosing the fastening element over part of its length, and has its axial position on the bushing secured by annular flanges arranged at opposite ends of the bushing.

PRIOR ART

An attachment element of the abovementioned type is known from DE 10013845 A1. In the case of the known device, the connecting element is mounted with a sliding fit on a bushing which comprises two parts, of which the facing end surfaces butt against one another. The sliding mounting usually satisfies the requirements which are to be fulfilled. However, problems may arise if heavy articles are to be turned in addition to being raised. In order to increase the rotatability of a connecting element, it is known from DE 8406130.8 U1 to arrange, between the fastening element and the connecting element, a series of rolling-contact bodies with the rolling-contact bodies comprising balls which have to be introduced into their guide path from the outside of the connecting element with comparatively high outlay. The use of just one series of rolling-contact bodies places narrow limits on the tilting resistance of the connecting element in relation to the fastening element of this second known device. Finally, U.S. Pat. No. 3,371,951 A discloses an attachment device in the case of which the fastening element, which is formed by a bolt, is retained by two bushings which enclose the fastening element. In order to ensure the rotatability of the attachment element in the case of this device, the two bushings are supported, on the one hand, against the head of the bolt, which forms the fastening element, via an axial bearing comprising two bearing rings and balls, and, on the other hand, on the article which is to be provided with the attachment device, via a further axial bearing of the same design and an intermediate ring. The third known device is unsatisfactory insofar as it is of complicated construction and the rolling-contact bodies of its axial bearings are subjected to an uncontrolled level of prestressing which depends on the tightening torque of the bolt designed as the fastening element.

DESCRIPTION OF THE INVENTION

The object of the invention, in the case of an attachment device of the type in question, is to increase the relative movement capability between the fastening element and the connecting element by replacing the sliding mounting with an easy-to-install rolling-contact mounting, a high level of tilting resistance of the connecting element being desired at the same time. This object is achieved, in the case of an attachment device of generic type, in that the connecting element is supported on the bushing, in the region of the annular flanges of the bushing, via a series of rolling-contact bodies in each case.

The attachment device according to the invention is quick and easy to assemble. The level of tilting resistance of its connecting element is high, on account of the use of two series of rolling-contact bodies which are spaced apart from one another by the greatest possible distance, and the rotatability of the connecting element leaves nothing to be desired, even for raising heavy loads.

Further features and details of the invention can also be gathered from the subclaims and the following description of two embodiments of the invention which are illustrated in the attached drawing.

BRIEF DESCRIPTION OF THE DRAWINGS

In the drawings:

FIG. 1 shows the front view of a first attachment device,

FIG. 2 shows a section along line II-II in FIG. 1,

In FIGS. 1 and 2, 1 is a fastening element which is formed by a bolt and on which a bushing 4 comprising two parts 2 and 3 is mounted. The two parts 2 and 3 overlap in the central region of the bushing 4 and are connected to one another by a press fit in the overlapping zone. A spring ring 5 secures the position of the bushing 4 on the fastening element 1.

Figure 3:
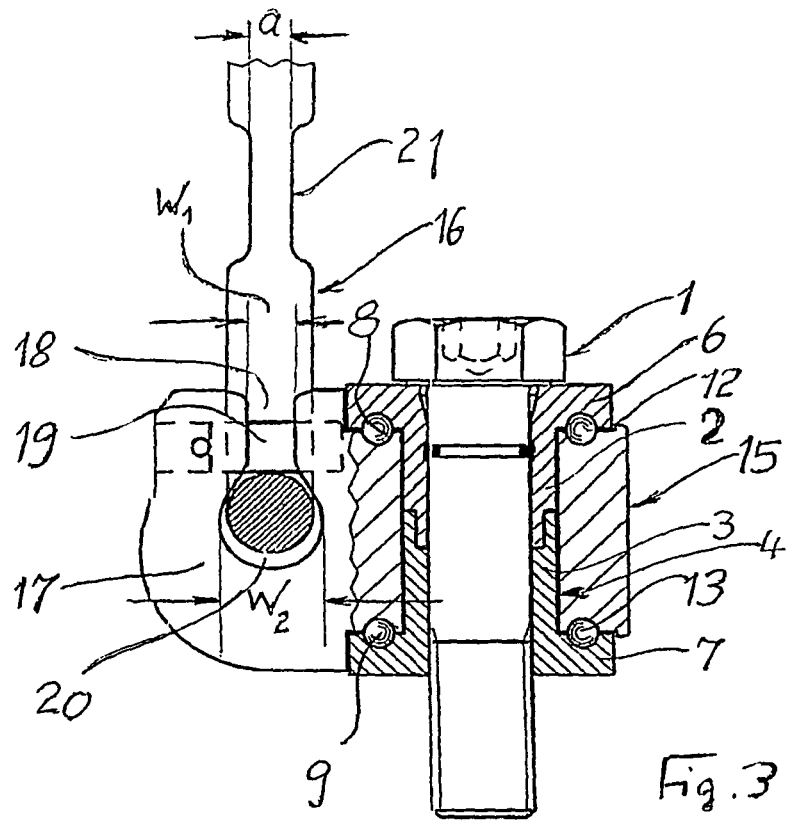
FIG. 3 shows, partly in section, the side view of a second attachment device.

At its opposite ends, the bushing 4 has two annular flanges 6 and 7, which merge into the cylindrical part of the bushing 4 via conical surfaces 8 and 9. In the region of the conical surfaces 8 and 9, two series of rolling-contact bodies 12 and 13 are arranged between the bushing 4 and a connecting element 10, which connects the fastening element to an annular attachment element 11, these series of rolling-contact bodies, element 10, forming angular roller bearings. The series of rolling-contact bearings 12 and 13 are easy to install in that, first of all, the rolling-contact bodies of the series of the rolling-contact bodies 13 are positioned on the conical surface 9, the connecting element 10 is then pushed over the bottom part 3 of the bushing 4, the rolling-contact bodies of the series of rolling-contact bodies 12 thereafter, are lined up in a row on the running surface provided on the connecting element 10, and following this, the top part 2 and the bottom part 3 of the bushing are pressed together. In a final installation step, the fastening element 1 is forced into the bushing 4 until the spring ring 5 latches into a groove 14 in the interior of the bushing 4.

Figure 4:
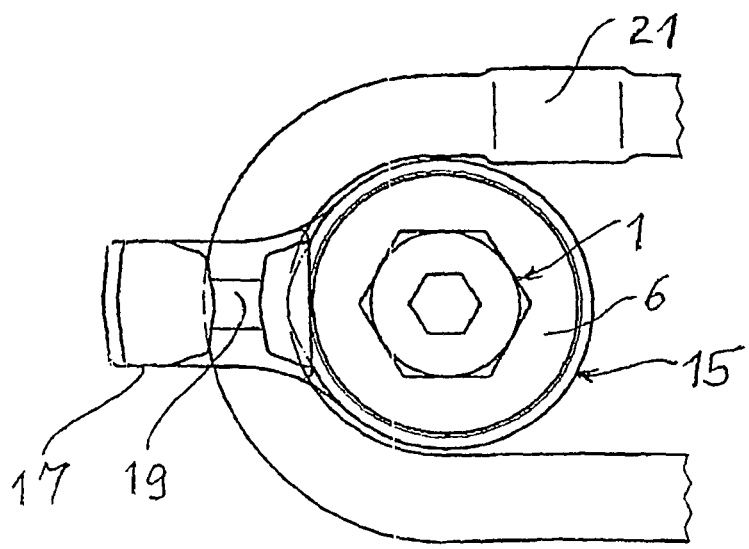
FIG. 4 shows a plan of view of the attachment device according to FIG. 3 with the attachment element swung over the fastening element.

In the case of the attachment device according to FIGS. 3 and 4, in which use is made of the same designations for parts which correspond to the parts illustrated in FIGS. 1 and 2, the connecting elements 15 is assembled with the fastening element 1 in the same way as has been described above, so that, in this respect, you can refer to what has already been said. The difference between the second embodiment and the first embodiment described above is that the attachment element 16 of the second embodiment is connected in a releasable manner to the connecting element 15. For this purpose, the connecting element 15 is provided with a fork head 17 which has an introduction gap 18 which can be bridged by a transverse bolt 19. The introduction gap 18, which has an inside width $W_1$, is adjoined by an eyelet 20 with an inside width $W_2$, which corresponds at least to 1.5 times the inside width $W_1$ of the introduction gap 18.

Using a connecting element 15 with a fork head 17 makes it possible to combine the connecting element 15 with different types of attachment element. It is advantageous here to use attachment elements which, like the attachment element 16 illustrated in FIGS 3 and 4 and formed by a suspension member, are provided with a flattened zone 21, of which the thickness a is smaller than the inside width $W_1$ of the introduction gap 18.

The invention claimed is:

1. An attachment device for attaching slinging or lashing means to articles which are to be transported or lashed, said attachment device having a fastening element (1) for fastening said attachment device to said articles, said fastening element formed by a bolt, having an attachment element (11, 16) for the slinging or lashing means, and having a connecting element (10, 15) which connects the fastening element (1) to the attachment element (11, 16) such that the connecting element is rotatable relative to the fastening element (1), on a two-part bushing (4) enclosing the fastening element (1) over part of a length of the fastening element, an axial position of the connecting element on the two-part bushing (4) being secured by annular flanges (6, 7) arranged at opposite ends of the bushing (4), wherein the connecting element (10, 15) is supported on the bushing (4), in a region on each of the annular flanges (6, 7) of the bushing (4), by a series of rolling-contact bodies (12, 13), characterized in that the series of rolling-contact bodies (12, 13), together with the connecting element (10, 15) and the bushing (4), form angular roller bearings.

2. The attachment device as claimed in claim 1, characterized in that the two parts (2, 3) which form the bushing (4) overlap at least partially and, in the region of their overlap, are connected to one another by a press fit.

3. The attachment device as claimed in claim 1, characterized in that the attachment element (11, 16) is mounted in a pivotable manner on the connecting element (10, 15) at a distance from the longitudinal axis of the fastening element (1).

4. The attachment device as claimed in claim 1, characterized in that the connecting element (15) has a fork head (17) in which the attachment element (16) can be suspended.

5. The attachment device as claimed in claim 4, characterized in that the fork head (17) is provided with an eyelet (20) which adjoins an introduction gap (18), which can be bridged by a transverse bolt (19), and of which the inside width ($W_2$) is greater than the inside width ($W_1$) of the introduction gap (18).

6. The attachment device as claimed in claim 5, characterized in that the attachment element (16) is provided with a flattened zone (21), of which the thickness (a) is smaller than the inside width ($W_1$) of the introduction gap (18).

7. The attachment device as claimed in claim 1, characterized in that the attachment element (11, 16) is formed by a suspension member which can be swung over the fastening element (1).

8. An attachment device for attaching slinging or lashing means to articles which are to be transported or lashed, said attachment device having a fastening element (1) for fastening said attachment device to said articles, said fastening element formed by a bolt, having an attachment element (11, 16) for the slinging or lashing means, and having a connecting element (10, 15) which connects the fastening element (1) to the attachment element (11, 16) such that the connecting element is rotatable relative to the fastening element (1), on a two-part bushing (4) enclosing the fastening element (1) over part of a length of the fastening element, an axial position of the connecting element on the two-part bushing (4) being secured by annular flanges (6, 7) arranged at opposite ends of the bushing (4), wherein two series of rolling-contact bodies (12, 13) are mounted between the connecting element (10, 15) and the annular flanges (6, 7) of the bushing (4), characterized in that the two series of rolling-contact bodies (12, 13), together with the connecting element (10, 15) and the bushing (4), form angular roller bearings.

\* \* \* \* \*